United States Patent [19]

Cullin

[11] Patent Number: 4,663,937

[45] Date of Patent: * May 12, 1987

[54] ELECTRO-MECHANICAL-HYDRAULIC POWER GENERATING SYSTEM

[75] Inventor: John Cullin, Queens, N.Y.

[73] Assignee: Creative Energy Technologies, Inc., New York, N.Y.

[*] Notice: The portion of the term of this patent subsequent to Aug. 12, 2000 has been disclaimed.

[21] Appl. No.: 280,245

[22] Filed: Jul. 6, 1981

[51] Int. Cl.[4] ............ B60K 17/08; F15B 15/18
[52] U.S. Cl. ............ 60/431; 60/419; 60/487; 60/911; 74/740; 180/65.3; 180/65.4
[58] Field of Search ........ 60/413, 419, 431, DIG. 2, 60/433, 487, 325; 180/305, 65.4, 65.1, 65.3, 307; 74/745, 740

[56] References Cited

U.S. PATENT DOCUMENTS

| | | | |
|---|---|---|---|
| 1,562,903 | 11/1925 | Miller | 180/65 D |
| 3,212,263 | 10/1965 | Hann | 60/389 |
| 3,359,727 | 12/1967 | Hann et al. | 60/389 |
| 3,379,008 | 4/1968 | Manganaro | 60/408 X |
| 3,430,438 | 3/1969 | Weiss | 60/487 |
| 3,463,034 | 8/1969 | Miller | 74/740 X |
| 3,805,676 | 4/1974 | Hamma et al. | 60/433 X |
| 3,828,880 | 8/1974 | Smith | 60/325 |
| 3,830,326 | 8/1974 | Hartung | 180/305 |
| 3,948,047 | 4/1976 | Gilbert | 180/305 X |
| 4,086,764 | 5/1978 | Brown | 60/DIG. 2 |
| 4,109,772 | 8/1978 | Poore | 60/431 X |
| 4,215,545 | 8/1980 | Morello et al. | 60/413 |
| 4,298,082 | 11/1981 | Ramos | 180/65 R |

Primary Examiner—George L. Walton
Attorney, Agent, or Firm—Emmanuel J. Lobato

[57] ABSTRACT

A power generating system comprising a hydraulic transmission driven by an electric motor. The hydraulic transmission drives electric generators for recharging the electric motor battery, and a speed reducing mechanism and reverse speed reducing mechanism before and after the hydraulic transmission, respectively, allow the system to operate in optimum efficiency.

13 Claims, 6 Drawing Figures

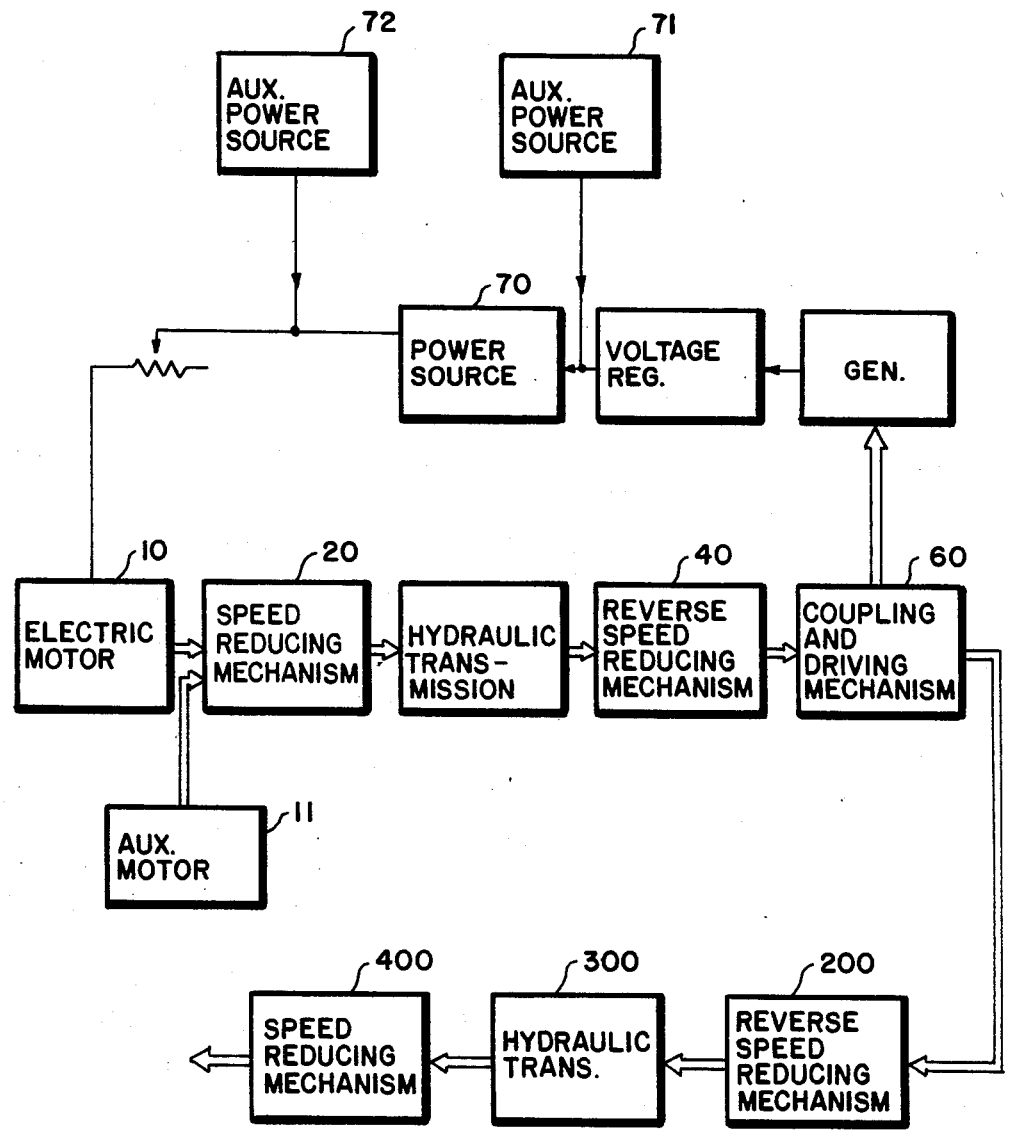
FIG.IA

ELECTRO-MECHANICAL-HYDRAULIC POWER GENERATING SYSTEM

BACKGROUND OF THE INVENTION

The present invention relates to a power generating system, and more particularly to an electro-mechanical-hydraulic power generating system.

Various types of power generating systems are known. Frequently, such systems incorporate a prime mover, a transmission system for transmitting power generated by the prime mover, and an output device for delivering the power transmitted by the transmission system to a machine which utilitizes the transmitted power to perform work. A good example of such a power generating system is found in motor vehicles, wherein the prime mover is the vehicle's internal combustion engine, the transmission system includes the vehicle's drive train, and the output device is the vehicle's hub to which wheels are attached for performing work by propelling the vehicle.

The greater the work ultimately to be performed, the more powerful the prime mover must be. Demands for power generating systems capable of handling greater and greater work loads have been met by providing prime movers having progressively greater torque outputs, while the output speed of typical prime movers has not been correspondingly increased. For example, large earth moving machines use massive diesel engines which operate at a few thousand R.P.M., within the same speed operating range as conventional passenger automobile engines. When the prime mover is an internal combustion engine it is not practicable to increase the prime mover's power output by increasing its operating speed. Practical limitations dictate that internal combustion engines not operate, in the usual case, greater than a few thousand R.P.M.

Presently there is a considerable interest in power generating systems, for vehicular use and for other applications, which include an electric motor for a prime mover. However, low-speed high-torque electric motors, suitable for vehicular use and having operating characteristics comparable to internal combustion engines presently used in motor vehicles, are large and expensive. Additionally, electric motors require a source of electricity. When the electric motor is used to power a vehicle the source of electricity must necessarily be provided from a storage device, such as a battery. Battery depletion is a serious limitation on the use of electric motors for performing a large amount of work.

Power transmission systems are made in a wide variety of different designs. Some are purely mechanical, while others are hydraulic or mechanical-hydraulic. Hydraulic power transmission systems have found widespread application when very heavy loads are involved. When the amount of work to be performed is extremely large there may be no practical alternative but to use hydraulic transmission systems. For example, giant earth moving vehicles use hydraulic transmissions for controlling the large amounts of power, at very high torques, generated by their large internal combustion engines.

SUMMARY OF INVENTION

It is an object of the present invention to provide a power generating system using a small electric motor that can handle extremely high loads.

It is another object of the present invention to provide a power generating system using an electric motor that is highly efficient so as to minimize power source depletion.

It is still another object of the present invention to provide a power generating system operating with a high speed electric motor and having a reliable and practicable power transmission system.

Still another object of the present invention is to provide a simple and reliable power generating system for use with high loads.

Another object of the present invention is to provide a highly efficient power generating system using an electric motor that exhibits low net energy consumption.

Another object of the present invention is to provide a simple and reliable power generating system using an electric motor and which is practicable for mobile operation.

It is still another object of the invention to provide a closed power generating system having an internal rechargeable source of stored energy.

It is still another object of the invention to provide a power generating system having an internal rechargeable energy source and means internal of the system for recharging the internal energy source.

It is still another object of the invention to provide a prime mover having a self-contained energy generating system.

As used herein, the term "mechanical output" means mechanical energy in a useable form. For example, the mechanical output developed by a mechanism may be the rotation of a shaft, or the reciprocation of a piston. The particular form of the mechanical output will depend on the structure of the device developing the mechanical output.

The power generating system according to the invention, is comprised of an electric motor responsive to an electrical power signal for producing a mechanical output to perform work, a speed reducing mechanism driven by the electric motor for developing a mechanical output to perform work and having a speed relatively less than the speed of the mechanical output of the electric motor, a controllable hydraulic transmission driven by the speed reducing mechanism for producing a mechanical output to perform work, a reverse speed reducing mechanism driven by the hydraulic transmission for developing a mechanical output to perform work, a rechargeable source of electrical energy for energizing the electric motor, a mechanical-to-electrical transducer connected for recharging the source of electrical energy, and coupling and driving means. The coupling and driving means couples the mechanical-to-electrical transducer to the reverse speed reducing mechanism to drive the mechanical-to-electrical transducer to recharge the source of electrical energy, and for developing a mechanical output for performing work.

The power generating system according to the invention may further comprise means comprising a voltage regulator for applying an electrical output signal from the mechanical-to-electrical transducer to the rechargeable source of electrical energy and for regulating the applied voltage for recharging the rechargeable source of electrical energy.

The mechanical-to-electrical transducer may comprise a conventional generator. The rechargeable source of electrical energy may be an electro-chemical cell, such as a battery.

The power generating system according to the invention may further comprise means for applying the electrical power signal from the rechargeable source of electrical energy to the electrical motor to operate the motor and which includes means for controlling the power of the electrical power signal applied to the electric motor in order to control the speed of the electric motor. The means for controlling the power of the electrical power signal may include means for limiting the electric current applied to the motor, for example, a sensing relay. The power generating system also includes means for controlling the hydraulic transmission to control the power output of the hydraulic transmission and may contain a means for synchronizing the control systems.

The coupling and driving means may be comprised of a shaft mounted for rotation about its longitudinal dimension for being driven and for driving, a gear mounted on the shaft for rotating with the shaft, and means for mounting the mechanical-to-electrical transducer in a position to be driven by the gear when the shaft rotates. The gear advantageously may comprise a fly wheel.

BRIEF DESCRIPTION OF THE DRAWINGS

FIGS. 1 and 1A are block diagrams of the power generating system according to the present invention;

DETAILED DESCRIPTION OF THE INVENTION

Figure 1:
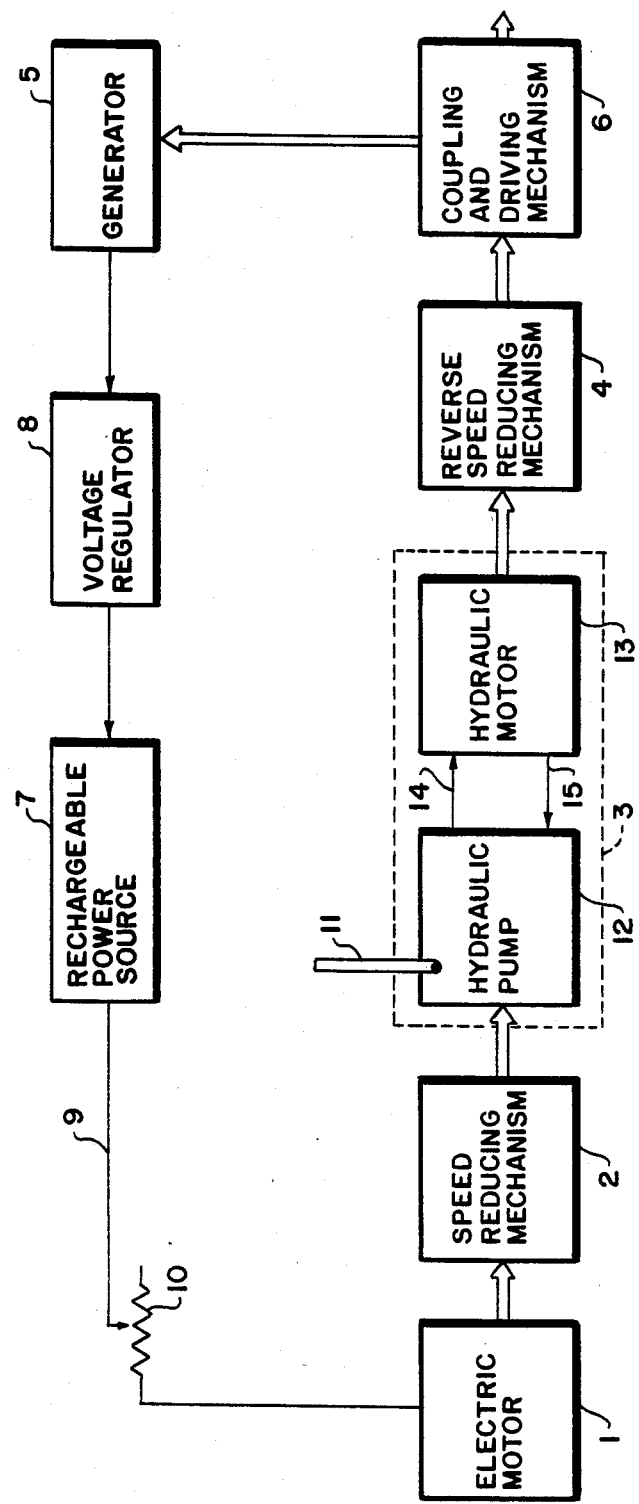

FIG. 1 is a block diagram representation of the power generating system according to the present invention. In the drawing the mechanical output of a mechanism is represented by a broad arrow extending from the mechanism that produces the mechanical output to the mechanism that receives the mechanical output.

An electric motor 1 receives an electrical power signal for developing a mechanical output which is applied to a speed reducing mechanism 2. The speed reducing mechanism 2 is driven by the mechanical output of the electric motor 1 and in turn developes a mechanical output for performing work and having a speed relatively lower than the electric motor speed.

The hydraulic transmission 3 receives the mechanical output of the speed reducing mechanism 2, and the hyrdraulic transmission developes a mechanical output applied to a reverse speed reducing mechanism 4. The hydraulic transmission 3 is controllable for controlling the output speed of its mechanical output relative to the speed of the mechanical input applied thereto, and for controlling the direction of its mechanical output.

The reverse speed reducing mechanism 4 has a speed-up ratio which is the inverse of the speed reduction ratio of the speed reducing mechanism 2.

A generator 5 is driven by the mechanical output of the reverse speed reduction mechanism 4. This is accomplished through the coupling and driving mechanism 6 which is discussed in more detail below. The coupling and driving mechanism 6 is effective for coupling the generator 5 to the reverse speed reducing mechanism 4 to drive the generator 5, and for developing a separate mechanical output to perform work.

The generator 5 is a mechanical-to-electrical transducer. Other types of mechanical-to-electrical transducers are within the scope of the present invention, and the invention is not limited to just a generator.

An electrical output signal from the generator 5 is applied to a rechargeable battery 7. The present invention is likewise not limited to a battery, but a rechargeable source of electrical energy, whether electro-chemical or of another type, may be used in place of the battery 7.

The voltage of the electrical signal applied from the transducer 5 is regulated by a voltage regulator 8. The voltage regulator 8 may not be necessary in some applications of the present invention, however, it is shown in this embodiment for completeness.

Finally, an electrical power signal is applied from the battery 7 through the electrical signal path 9 to power the electric motor 1. The electrical signal path 9 from the battery to the electric motor 1 may include a control 10, such as a rheostat, for controlling the power applied to the motor 1. Thus, the control 10 operates as a speed control. Additionally, the control 10 includes mechanical linkage 11 for controlling the hydraulic transmission 3 for synchronizing the motor speed and the transmission speed. This linkage is commercially available and prevents the motor from driving the speed reducing mechanism to turn against the hydraulic transmission when it is stalled, in which case, no output power generation would occur, and to prevent damage to the electric motor.

The hydraulic transmission 3 is hydrostatic transmission generally comprised of a controllable hydraulic pump 12 and a hydraulic motor 13. The hydraulic motor 13 may be controllable. The hydraulic pump 12 is driven by the mechanical output of the speed reducing mechanism 2 for developing pressure within hydraulic fluid that is supplied to the hydraulic motor 13. The hydraulic fluid under pressure is supplied to the hydraulic motor 13 through the conduit 14, and low pressure fluid returns from the hydraulic motor 13 to the hydraulic pump 12 through the fluid conduit 15. By controlling the pump pressure the hydraulic fluid pressure to the hydraulic motor 13 is controlled, and thus the speed of the hydraulic motor 13 is controlled.

Hydraulic transmissions of the type described are known. Hydraulic hydrostatic transmissions suitable for use in the present invention are described in U.S. Pat. No. 3,212,263 and U.S. Pat. No. 3,359,727. The disclosures of these patents are incorporated herein by reference.

In operation, the electric motor is energized by the battery 7 for driving, through the speed reducing mechanism 2, the hydraulic pump 12 of the transmission 3. Typically, the electric motor 1 will be a high speed motor that is physically small. The speed reducing mechanism 3 is used to develop a mechanical output having a lower speed and higher torque than the electric motor mechanical output. The hydraulic transmission 3 then controls the transmission of the low speed high torque mechanical output from the speed reducing mechanism 2. Subsequently, the reverse speed reducing mechanism 4 develops a higher speed output for performing work.

The electric motor 1 is energized by the battery 7 and normally, the battery 7 would be depleted in proportion to the energy supplied by the battery during the performance of work. However, according to the present invention a portion of the mechanical output from the reverse speed reducing mechanism 4 is used to drive the generator 5 for generating an electrical signal for recharging the battery 7. This feature of the present invention results in a longer battery life than if the battery 7 were used to energize the electric motor 1 without being recharged during operation by the generator 5.

The fact that the feedback loop defined by the generator 5 prolongs battery life is a very surprising result. One would expect that the work necessary to drive the generator 5 for recharging the battery would result in a corresponding amount of energy being discharged from the battery so that the feedback loop for recharging the battery would, at best, have no effect on battery life. However, specific gravity tests of the battery acid have shown that in operation the battery 7 will not discharge as rapdily as if it is used to energize an electric motor without recharging current being supplied from the generator 5 during battery operation.

EXAMPLE

An embodiment of the invention has been constructed using the following components.

Electric motor 1: Delco-Remy model 1113953, series 40 MT, type 250. Under no load conditions this motor developed between 5,000 to 9,000 R.P.M. at an operating voltage of 20 volts and a current of between 70 to 110 amps. Under a load comprised of a 5,000 lb. wheeled vehicle the motor operated between 0 to 6,000 R.P.M. at an operating voltage of 24 volts and a current of between 70 to 180 amps.

The starter motor was modified by removing the solenoid, and by removing the bendix drive and replacing it with a spline shaft. The motor bushings were replaced with bearings, and the motor end plates were replaced with end plates that could accomodate the bearings. Finally, the motor was oil cooled and lubricated by oil from the gear train oil pump since it is operated continuously.

Hydraulic transmission 3: Sundstrand 20-27 Series transmission without modification.

Generator 5: Delco-Remy model 1117692, series 50 DN, type 600. This is an oilcooled self rectifying AC generator. The field current at 80 F is between 5.7 to 6.2 amps at 24 volts, the output voltage is 28 volts and the output current 90 amps at 1400 R.P.M. to about 240 amps at 4,000 R.P.M.

Voltage Regulator B: Delco-Remy model 9000599. This model is transistorized and has a negative ground.

Figure 5:
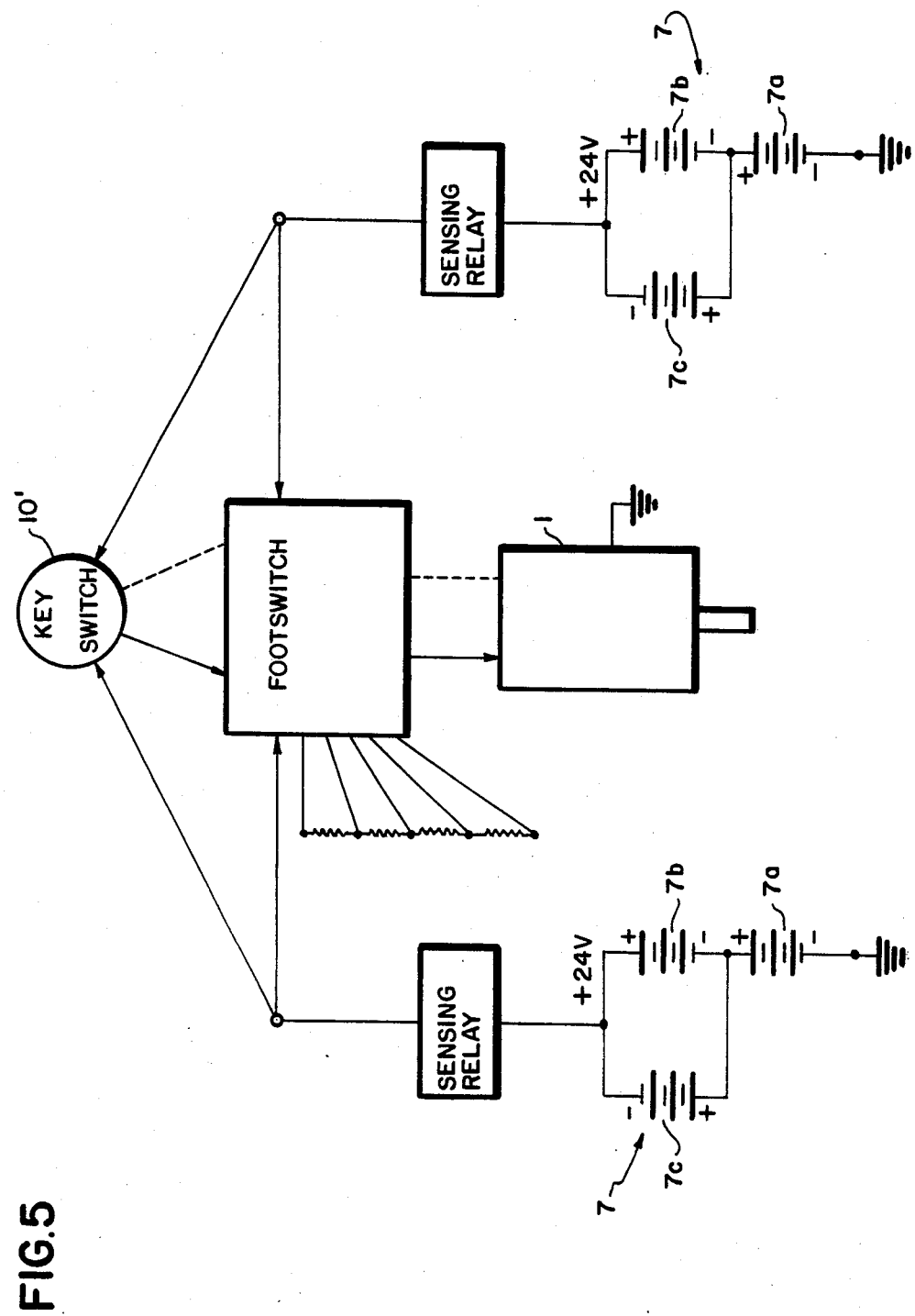
FIG. 5 is a wiring diagram.

Battery 7: Delco-Remy model 1980233. This is a 12 volt battery rated at 200 amperes. Fully charged its electrolyte has a specific gravity of 175. Six of these batteries were connected in two groups of three batteries as shown in FIG. 5 so that the total output voltage of the combination of six batteries was 24 volts.

The embodiment of the invention constructed using these components was installed in motor vehicle having a total weight of approximately 5,000 lbs. This vehicle was driven in normal traffic conditions and at highway driving speeds for approximately 360 miles. Battery discharge or depletion was so slight it was impossible to estimate how long the vehicle could be driven before the battery could be said to be discharged. After 360 miles of operation the specific gravity of the battery still measured 175.

FIG. 1A illustrates another embodiment of the power generating system according to the invention. This embodiment includes an auxiliary motor 11 for supplying a mechanical input to drive the speed reducing mechanism 20. This auxiliary motor 11 is used for initially driving the system from a rest condition or idle condition up to operating speed. Once the system operating speed is attained, the motor 11 is uncoupled from the system, and the system operates as previously described.

Motor 11 is not limited to an electric motor; for example, a water or gas driven turbine, a windmill or an internal combustion engine would be a suitable motor for driving the system up to operating speed before the electric motor 10 took over to maintain the system operating. In practice, the motor 11 could be coupled to the speed reducing mechanism 20 through a clutch mechanism so that the motor 11 could be uncoupled from the system once the system is operating.

The embodiment of the system shown in FIG. 1A also includes an auxiliary power source 71 connected for applying a recharging voltage to the rechargeable power source 70. The auxiliary power source 71 could be, for example, an array of solar cells for supplying electrical energy to recharge the power source 70 when the system is not operating.

FIG. 1A further illustrates another auxiliary power source 72 which supplies electrical energy to operate the electric motor 10. The auxiliary power source 72 energizes the electric motor 10 and can be used to start the system when it is in a rest condition until it has accelerated to an operating speed, after which the auxiliary power source 72 can be disconnected from the system.

The output of the coupling and driving mechanism 60 is applied to a speed reducing mechanism 200. The output of the speed reducing mechanism 200 is applied to hydraulic transmission 300, and the output of the hydraulic transmission 300 is, in turn, applied to a reverse speed reducing mechanism 400. The combination of the speed reducing mechanism 200, the hydraulic transmission 300 and the reverse speed reducing mechanism 400 is effective for controlling the mechanical output energy developed at the output of the reverse speed reducing mechanism 40. It will be understood that the power generating system according to the invention is not limited to just the embodiments shown in FIGS. 1 and 1A. For example, the embodiment shown in FIG. 1A need not include the combination of elements 200, 300 and 400, or the auxiliary motor 11 or either or both of the auxiliary power sources 71 and 72 could be omitted. The particular configuration of the power generating system according to the invention can be selected to best suit the particular application to which the invention is applied.

Figure 2:
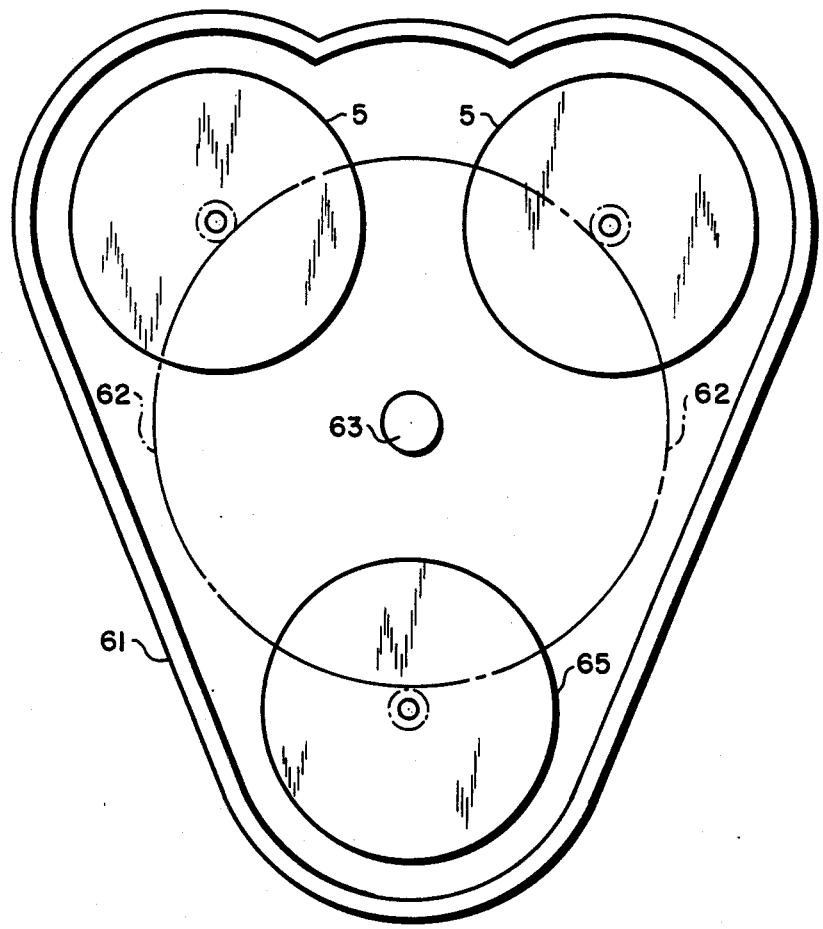
FIG. 2 is a front view of the coupling and driving assembly.
Figure 3:
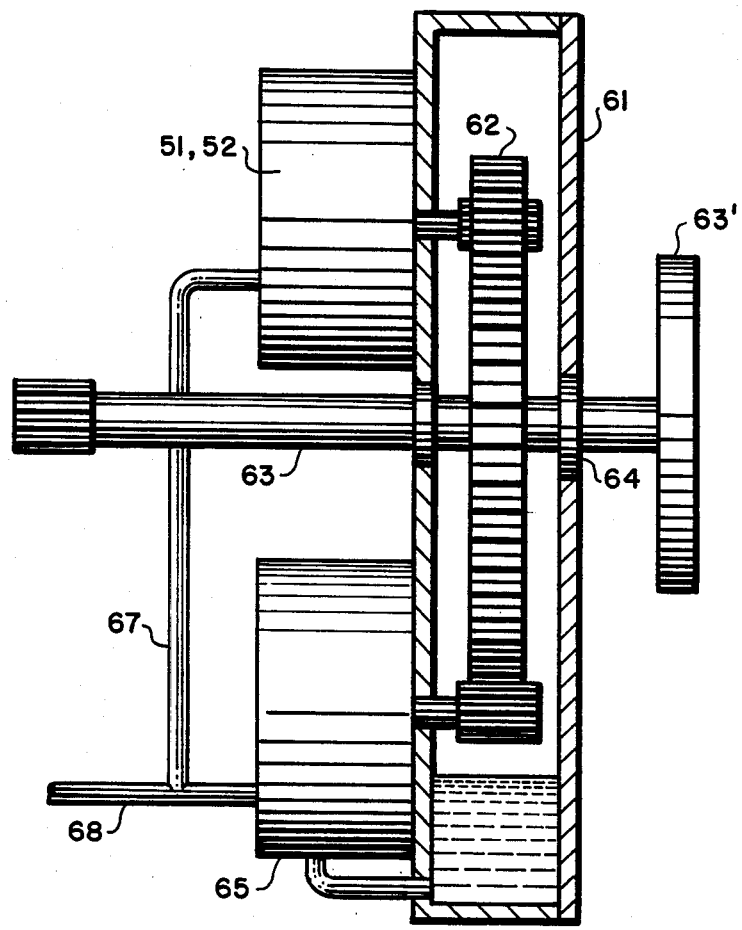
FIG. 3 is a side view of the coupling and driving assembly.
Figure 4:
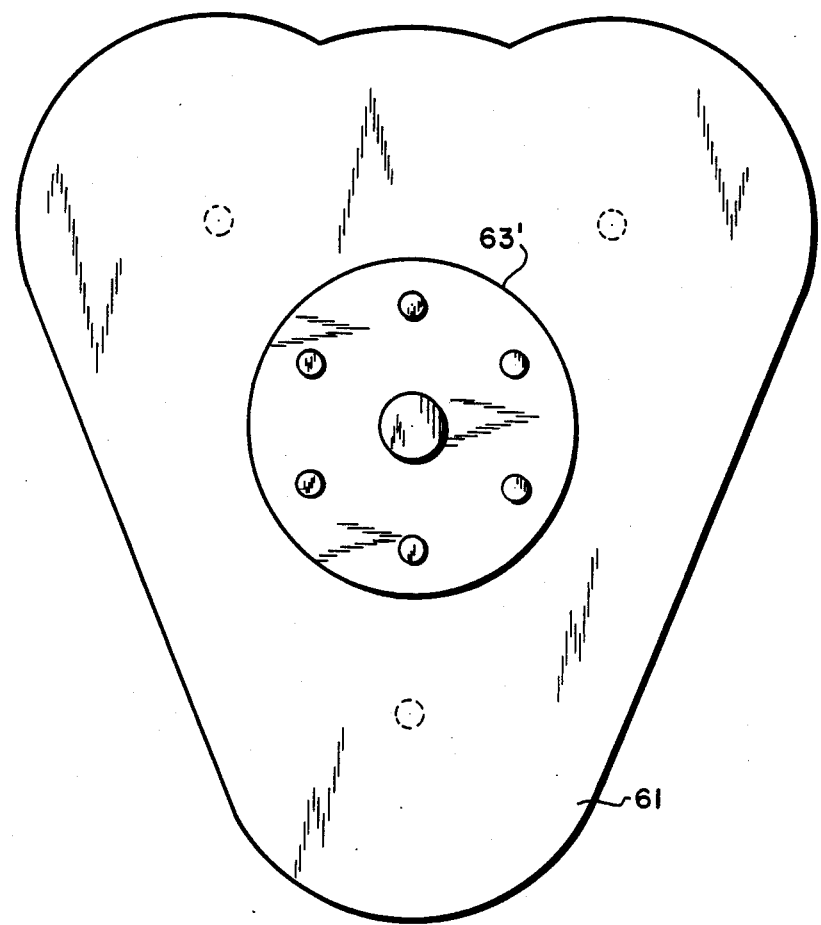
FIG. 4 is a rear view of the coupling and driving assembly.

FIGS. 2–4 illustrate one particular example of the coupling and driving assembly for coupling the generator 5 to the speed reducing mechanism 4 and for driving the generator 5. The coupling and driving assembly is comprised of a case 61 housing a gear 62 mounted for rotation within the case 61 and for driving a pair of oil cooled alternators 51, 52 which comprise the generator 5. The gear 62 which may comprise a fly wheel is mounted on a shaft 63 which is mounted for rotation by a bearing 64 mounted on the case 61. One end of the shaft 63 is splined for coupling with the reverse speed reduction mechanism 4 and the other end of the shaft 63 has a flange 64 for coupling to any mechanism to which the mechanical output of the system is to be delivered.

The alternators 51,52 and an oil pump 65 are mounted on the case 61. The oil pump 65 is driven by the gear 62 when the shaft 63 is rotated by the mechanical output of the reverse speed reducing mechanism 4. The bottom of the case 61 comprises an oil sump for oil that is delivered under pressure by the oil pump 65 through oil line 67 to the oil cooled alternators 51,52. An oil line 68 can also be provided for delivering oil to the electric motor 1, if that motor is oil cooled.

FIG. 5 illustrates the wiring diagram for the interconnection of the motor 1 and the power source 7. The variable resistor 10 incorporates a conventional footswitch so that the resistor setting can be controlled by a foot pedal. A pair of 24 volt batteries together comprise the power source 7 and are connected to the footswitch 10 through conductor 9. A key switch 10' is also connected to the batteries comprising the power source 7, and a control circuit path, shown as a dashed line, connects the key switch 10' and the footswitch of the resistor 10. The electric motor 1 is connected to the resistor 10 footswitch by two conductors; one shown by solid line for applying power to the electric motor 1, and the other shown by a dashed line for providing a control line.

When the key switch 10' is closed, a voltage is applied to the motor 1 through the resistor 10 under control of the resistor footswitch. The footswitch setting determines the resistor value and hence the voltage value applied to the motor 1. Motor operation is terminated by opening the key switch 10'.

Each of the 24 volt batteries comprising the power source 7 is comprised of three 12 volt batteries 7a, 7b and 7c. Batteries 7a and 7b are connected in series, and battery 7c is connected in parallel with battery 7b. This interconnection of the three batteries 7a, 7b and 7c develops a 24 volt output and a high output current.

The foregoing preferred embodiments of the power generating system are illustrative only, and the scope of the invention herein is defined by the following claims.

I claim:

1. A power generating system, comprising:
a relatively high speed electric motor for producing a mechanical output for performing work;
a speed reducing mechanism being driven by said electric motor and developing a mechanical output for performing work and having a relatively lower speed and a higher torque than the output of said motor;
a hydraulic hydrostatic transmission driven by the output of said speed reducing mechanism for controlling the transmission of the low speed and high torque mechanical output from said speed reducing mechanism, said speed reducing mechanism being connected in series with said electric motor and said hydrostatic transmission for delivering the mechanical output of said electrical motor to said hydrostatic transmission, said hydraulic transmission comprising a variable hydraulic pump driven by said speed reducing mechanism for pumping hydraulic fluid under pressure, a hydraulic motor responsive to hydraulic fluid under pressure for developing a mechanical output for performing work, and means defining a hydraulic fluid circuit between said variable hydraulic pump and said hydraulic motor for delivering hydraulic fluid under pressure from said variable hydraulic pump to said hydraulic motor for operating said hydraulic motor;
a reverse speed reducing mechanism connected in series with; said hydraulic motor of said hydraulic transmission for developing a mechanical output for performing work and having a speed relatively greater than the mechanical output speed of said hydraulic motor;
a rechargeable electro-chemical source of electrical energy;
means for applying electrical energy from said source of electrical energy to said electric motor for operating said electric motor;
a mechanical-to-electrical transducer connected for recharging said source of electrical energy; and
coupling and driving means for coupling said mechanical-to-electrical transducer to said reverse speed reducing mechanism to drive said mechanical-to-electrical transducer and for developing a mechanical output for performing work.

2. A power generating system comprising:
an electrical motor responsive to an electric power signal for producing a mechanical output to perform work;
a speed reducing mechanism being driven by said electric motor and developing a mechanical output to perform work and having a speed relatively less than and a torque relatively greater than, the mechanical output of said electric motor;
a controllable hydraulic hydrostatic transmission driven by said speed reducing mechanism for controlling the transmission of the low speed and high torque mechanical output from said speed reducing mechanism, said speed reducing mechanism being connected in series with said electric motor and said hydrostatic transmission for delivering the mechanical output of said electrical motor to said hydrostatic transmission;
a reverse speed reducing mechanism connected in series with said hydraulic transmission and developing a mechanical output to perform work and having a speed relatively greater than the speed of the mechanical output of said hydraulic transmission;
a rechargeable source of electrical energy connected for energizing said electric motor;
a mechanical-to-electrical transducer connected for recharging said rechargeable source of electrical energy;
coupling and driving means for coupling said mechanical-to-electrical transducer to said reverse speed reducing mechanism to drive said mechanical-to-electrical transducer to recharge said rechargeable source of electrical energy and for developing a mechanical output for performing work.

3. A power generating system according to claim 2, comprising means for applying an electrical output signal from said mechanical-to-electrical transducer to said rechargeable source of electrical energy, said means including a voltage regulator for regulating the voltage applied for recharging said rechargeable source of electrical energy.

4. A power generating system according to claim 2, wherein said mechanical-to-electrical transducer is a generator.

5. A power generating system according to claim 2, wherein said rechargeable source of electrical energy is an electrochemical cell.

6. A power generating system according to claim 2, comprising means for applying an electrical power signal from said rechargeable source of electrical energy to said electric motor to operate said electric motor, said means for applying an electric power signal including means for controlling the power of the electrical power signal applied to said electric motor.

7. A power generating system according to claim 2, comprising means for controlling said hydraulic transmission to control the power output of said hydraulic transmission.

8. A power generating system according to claim 1 or 3, wherein said coupling and driving means is comprised of a shaft mounted for rotation about its longitudinal dimension for being driven and for driving, mounting means for mounting said shaft for rotation about its longitudinal dimension, a gear mounted on said shaft for rotating with said shaft, and means for mounting said mechanical-to-electrical transducer in a position to be driven by said gear when said shaft rotates.

9. A power generating system according to claim 8, wherein said gear comprises a fly wheel.

10. A power generating system according to claim 1 or 2, further comprising an auxiliary power source for initially energizing said electric motor.

11. A power generating system according to claim 1 or 2, further comprising an auxiliary motor for intially driving said speed reducing mechanism.

12. A power generating system according to claim 6, wherein said means for controlling the power of the electric power signal comprises means for limiting the current applied to said electric motor.

13. A power generating system according to claim 7, wherein said means for controlling said hydraulic transmission comprises means for synchronizing said hydraulic transmission and said electric motor.

* * * * *